Patented May 21, 1940

2,201,171

UNITED STATES PATENT OFFICE 2,201,171

MONOMERIC POLAR-SUBSTITUTED THIO-AMIDES AND THEIR PREPARATION

William Edward Hanford, Wilmington, Del., assignor to E. I. du Pont de Nemours & Company, Wilmington, Del., a corporation of Delaware No Drawing. Application September 15, 1938, Serial No. 230,142

18 Claims. (Cl. 260—551)

This invention relates to new surface-active organic compounds and their preparation, and more particularly to certain types of thioamides. The present application is a continuation-in-part of my copending application Serial Number 137,149, filed April 15, 1937.

This invention includes among its objects new secondary monomeric polar-substituted thioamides and their preparation. A further object is new surface-active agents and their preparation. Another object is to prepare surface-active secondary thioamides in which the thiocarbonyl residue is attached to carbon as well as to amido nitrogen. Still another object is to prepare thioamides of said type which also contain a long open hydrocarbon chain. A more particular object is to prepare long-chain sulfated and sulfonated secondary amides of carbothionic acids in which the thiocarbonyl group is attached to carbon as well as to amido nitrogen. Other objects will be evident from the description which follows.

The term "polar group" is used herein to describe a polyatomic group containing an inorganic element bound to a different and polyvalent element by a definitely though not perhaps completely polar bond (see Lewis, Valence and the Structure of Atoms and Molecules, page 84). By far the most important water solubilizing polar groups are the hydroxyl, tertiary amino, acid (containing ionizable hydrogen, e. g., sulfo, sulfato, carboxyl, etc.) and salt groups. The term "secondary thioamide" requires that the amido nitrogen or nitrogens have attached thereto one and only one amido hydrogen atom.

The objects outlined above are accomplished by the following invention which comprises secondary, surface-active, monomeric thioamides of carbothionic acid, which amides contain a water-solubilizing polar group and have the thiocarbonyl

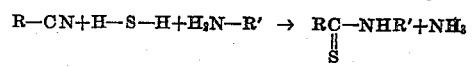

radical or radicals attached by one valence to carbon and by the other valence to amido nitrogen. In the preferred process embodiment of the invention, a nitrile and hydrogen sulfide are reacted with an amine having at least one primary amino group which is attached to an aliphatic carbon atom, i. e., a carbon atom which is not a part of an aromatic ring, the amine and nitrile being so selected that (a) one of them contains a polar group different from the reacting groups, (b) the sum of the nitrile and primary amino groups is less than four, and (c) in the case of polyfunctional reactants having a plurality of reacting groups, the reacting groups are separated by a chain of at least two carbon atoms contiguous therewith and preferably at least three carbon atoms in the case of polyreactant nitriles. That is, a monoamine may be reacted with hydrogen sulfide and a mononitrile or a dinitrile and a diamine may be reacted with hydrogen sulfide and a mononitrile, but the reaction of a polyamine with hydrogen sulfide and a polynitrile is not within the scope of the present invention as in such case a monomeric thioamide would not be obtained. When a polyfunctional reactant, e. g., a dinitrile or a diamine is employed, the reacting groups should be separated by a chain of at least two carbon atoms contiguous therewith, i. e., carbon atoms which are in the chain of which the nitrile or amino groups are a part. In the case of a polyreactant nitrile, the nitrile groups are preferably separated by chains of at least three carbon atoms to prevent formation of iminothioimides.

The following equation, in which R and R' are organic radicals, one of which contains a polar group, illustrates the reaction involving a mononitrile and a monoamine. The more complicated combinations can be represented similarly.

$$R-CN+H-S-H+H_2N-R' \rightarrow R\underset{\underset{S}{\|}}{C}-NHR'+NH_3$$

Alternatively, these surface-active secondary carbothionamides can be obtained by reacting hydrogen sulfide with a nitrile and a primary aliphatic amine (in which the sum of the amine and nitrile groups is less than four and in which, when polyfunctional, the nitrile and amine groups are separated by chains of at least two carbons), and then reacting the resulting thioamide with a reagent, such as a sulfating agent, which will introduce a polar group. It is to be noted that the present invention does not deal with, nor is either process of the invention applicable to the preparation of, amides, surface active or otherwise, of thiocarbonic acid (i. e., thioureas), in which the thiocarbonyl group is attached only to nitrogen.

The products of this invention, as named above by phraseology, fall into two major classes: (A) those derived from monoamines and (B) those derived from mononitriles. Both groups may be further divided into subclasses (1) those in which the polar group is present in that part of the molecule derived from the amine, and (2) those in which the polar group is in that part of the molecule derived from the nitrile. The following comprehensive formulas represent the two subclasses of each group. The various R's represent hydrocarbon radicals; Z represents a polar group; and $v$, $w$, $x$, and $y$ are whole numbers representing proper valences A—1  $R^1$—(CS—NH—$R^2$—Z)$_v$
A—2  Z—$R^3$—(CS—NH—$R^4$)$_w$
B—1  ($R^5$—CS—NH)$_x$—$R^6$—Z
B—2  (Z—$R^7$—CS—NH)$_y$—$R^8$ In these formulas the various R's ($R^1$–$R^8$) may be aliphatic, aromatic, araliphatic, or cycloaliphatic, but preferably hydrocarbon. Thus $R^1$, $R^4$, $R^5$ and $R^8$ may be alkyl, aryl, aralkyl, or cycloalkyl; and $R^2$, $R^3$, $R^6$ and $R^7$ may be alkylene, arylene, aralkylene or cycloalkylene. They may be saturated or unsaturated; straight or branched chain; monocyclic or polycyclic. The number of types and combinations is so numerous as to preclude illustration of each, but the following table will indicate the names, formulas, derivation, and class and sub-class of typical thioamides within the limits of the invention. So far as is known, any others of the indicated types may be similarly represented and prepared.

*Thioamides*

| Class | Name | Formula | Prepared from $H_2S$ |
|---|---|---|---|
| A—1 ($v=1$) | N-thiolauryltaurine | $C_{11}H_{23}C(=S)$—NH—$CH_2$—$CH_2SO_3H$ | Lauronitrile and taurine. |
| A—1 ($v=1$) | N-thiolaurylglycine | $C_{11}H_{23}C(=S)$—NH—$CH_2COOH$ | Lauronitrile and glycine. |
| A—1 ($v=1$) | Thiostearylaminoethyltrimethylammoniummethosulfate. | $C_{17}H_{35}C(=S)$—NH—$CH_2$—$CH_2$—N($CH_3$)($CH_3$)($CH_3O$—$SO_2$—O) | Stearonitrile and dimethylaminoethylamine, and then reaction with dimethyl sulfate. |
| A—1 ($v=1$) | N-thiostearylglycine | $C_{17}H_{33}C(=S)$—NH—$CH_2COOH$ | Stearonitrile and glycine. |
| A—1 ($v=1$) | 1-thiolaurylamino-3-sulfatopropane | $C_{11}H_{23}C(=S)$—NH—$CH_2$—$CH_2$—$CH_2OSO_2OH$ | Lauronitrile and 3-aminopropanol, and sulfation of the product. |
| A—1 ($v=1$) | N-thiomyristyltaurine | $C_{13}H_{35}$—C(=S)—NH—$CH_2$—$CH_2SO_3H$ | Myristonitrile and taurine. |
| A—1 ($v=1$) | 1-thiocaproyloylamino-6-dimethylaminohexane. | $C_7H_{15}$—C(=S)—NH—$(CH_2)_6$N($CH_3$)($CH_3$) | Caprylonitrile and N,N-dimethylhexamethylenediamine. |
| A—2 ($w=1$) | Sulfonated N-octylthiobenzamide | $HO_3S$—C$_6H_4$—C(=S)—NH—$C_8H_{17}$ | Benzonitrile and n-octylamine, and sulfonation of the product. |
| A—2 ($w=1$) | 5-carboxy-N-dodecylthiovaleramide | $HOOC$—$(CH_2)_4$—C(=S)—NH—$C_{12}H_{25}$ | Adipic acid mononitrile and n-dodecylamine. |
| A—2 ($w=1$) | N-octadecyl-α-piperidylthioacetamide | $C_5H_{10}$N—$CH_2$—C(=S)—NH—$C_{18}H_{35}$ | α-piperidylacetonitrile and n-octadecylamine. |
| A—2 ($w=1$) | N-octyl-ε-dimethylaminothiocapramide. | $(CH_3)_2$N—$(CH_2)_5$—C(=S)—NH—$C_8H_{17}$ | ε-dimethylaminocapronitrile and n-octylamine. |
| A—2 ($w=1$) | β-sulfato-N-heptadecylthiopropionamide. | $HOSO_2$—O—$CH_2$—$CH_2$—C(=S)—NH—$C_{17}H_{35}$ | Acrylonitrile and n-heptadecylamine, and sulfation of the product. |
| A—1 ($v=2$) | N,N-bis(ω-trimethylammoniumhexyl)thiosuccinamide chloride. | $[-(CH_2)$—C(=S)—NH—$(CH_2)_6$—N$(CH_3)_3$ Cl$]_2$ | Succinonitrile and N,N-dimethylhexamethylenediamine, and reaction of product with methyl chloride. |
| A—1 ($v=2$) | N,N-bis(ω-dimethylaminohexyl)thioadipamide. | $[-(CH_2)_2$—C(=S)—NH—$(CH_2)_6$—N$(CH_3)_2]_2$ | Adiponitrile and N,N-dimethylhexamethylenediamine. |
| A—1 ($v=2$) | N,N'-bis(ω-carboxyamyl)thiosuccinamide. | $(-CH_2C(=S)$—NH—$(CH_2)_5COOH)_2$ | Succinonitrile and ε-aminocaproic acid. |
| B—2 ($y=2$) | bis-α-dimethylaminothioacetylhexamethylenediamine. | $[(CH_3)_2N$—$CH_2$—C(=S)—NH—$(CH_2)_3$—$]_2$ | Dimethylamino-acetonitrile and hexamethylenediamine. |
| B—2 ($y=2$) | bis-β-sulfothiopropionyldecamethylenediamine. | $[HO_3S$—$(CH_2)_2$—C(=S)NH—$(CH_2)_5$—$]_2$ | β-sulfopropiononitrile and decamethylenediamine. |
| B—2 ($y=2$) | Sulfated bis-thiovinylacetylhexamethylenediamine. | $[CH_2$=CH—$CH_2$—C(=S)—NH$(CH_2)_3$—$]_2 \cdot H_2SO_4$ | Vinylacetonitrile and hexamethylenediamine, and sulfation of the product. |
| B—2 ($y=2$) | Sulfated bis-thiomethacryldecamethylenediamine. | $[CH_2$=C($CH_3$)—C(=S)—NH—$(CH_2)_5$—$]_2 \cdot H_2SO_4$ | α-methacrylonitrile and decamethylenediamine, and sulfation of the product. |
| B—1 ($x=2$) | N,N-bis(N-thiolauryl-β-aminoethyl)-dimethyl ammoniummethosulfate. | $(C_{11}H_{23}C(=S)$—NH—$CH_2$—$CH_2)_2$N$(CH_3)_2$ O—$CO_2$—$OCH_3$ | Lauronitrile and N,N-bis (β-aminoethyl) methylamine and reaction of product with dimethylsulfate. |

The thioamides of the present invention which find greatest utility in the surface-active field are those which are prepared from ingredients so selected that the final compound contains at least eight carbon atoms in a straight, open hydrocarbon chain. The majority of those given in the above table are of this kind.

In carrying out the process, the amine and nitrile are dissolved in an inert solvent which preferably boils 70–180° C. This solution may then be saturated with hydrogen sulfide at a temperature of 0–10° C. and subsequently heated in an autoclave at 100° C. or above for several hours. Alternatively, hydrogen sulfide may be passed into the solution of nitrile and amine at atmospheric pressure while heating to the refluxing temperature of the solvent until substantially no more hydrogen sulfide is absorbed. The thioamide is then isolated by removing the solvent and crystallizing or distilling the residue.

The more detailed practice of the invention is illustrated by the following examples, wherein parts given are by weight. There are of course many forms of the invention other than these specific embodiments.

Example I

N-(β-hydroxyethyl) thiolauramide

In a pressure vessel are placed 15.0 parts of β-aminoethanol, 37.0 parts of lauronitrile, and 50 parts of ethyl alcohol. This mixture is saturated with hydrogen sulfide at a temperature of 10° C. and the reaction vessel sealed and heated for 8 hours at 100° C. It is then opened and the alcohol evaporated off. The solid product which remains is N-(β-hydroxyethyl) thiolauramide of the formula

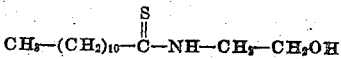

It is soluble in benzene, has surface-active properties, and is useful as a wetting agent. Evidence of its chemical character resides in the method of synthesis and in the fact that, on heating in benzene solution, hydrogen sulfide is evolved and 2-undecyl-4, 5-dihydrooxazole is formed.

Example II

Sodium N-(β-sulfo-ethyl) thiooleamide

To 15 parts of water and 100 parts of alcohol in a pressure vessel are added 14.7 parts of finely ground sodium β-aminoethanesulfonate and 26.3 parts of oleonitrile, and the mixture saturated with hydrogen sulfide. The pressure vessel is sealed and heated for at least 18 hours at 100° C., after which it is cooled, opened, and the contents evaporated to dryness. A wax-like paste is obtained which is soluble in water and produces a heavy foam on shaking. This material, which is the crude sodium salt of N-(β-sulfoethyl) thiooleamide, of the formula

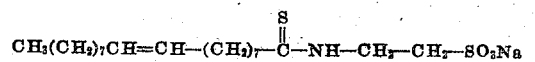

can be purified by washing with acetone, dissolving the residue in 12–15% aqueous alcohol, and evaporating off the alcohol and water. A white solid is obtained which on analysis has a sulfur content which checks within experimental error that calculated for N-(β-sulfo-ethyl) thiooleamide.

Example III

Sodium N-(β-sulfoethyl) thiolauramide

To 70 parts of alcohol and 7 parts of water in a pressure vessel are added 15.0 parts of finely powdered sodium β-aminoethanesulfonate and 18.1 parts of lauronitrile. The mixture is then saturated with hydrogen sulfide. The pressure vessel is sealed and heated at 100° C. for at least 18 hours, after which it is cooled and opened, and the contents evaporated to dryness. The product is sodium N-(β-sulfoethyl) thiolauramide, of the formula

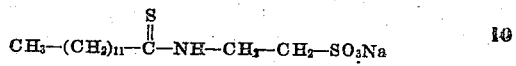

It can be purified by washing with acetone and crystallizing the residue from alcohol and water. It is soluble in water to give a surface-active solution.

Example IV

Sodium N-(β-sulfatoethyl) thiolauramide

One mol of N-(β-hydroxyethyl) thiolauramide, obtainable as in Example I, is dissolved in ether and cooled to about 20° C. To this solution is slowly added 1.1 mols of chlorosulfonic acid, the temperature being kept at 20–25° C. The reaction mixture is allowed to stand at room temperature for several hours, the ether removed by distillation and the residue (free sulfuric acid) dissolved in dilute aqueous sodium hydroxide. There is thus obtained an aqueous solution of sodium N-(β-sulfatoethyl) thiolauramide of the formula

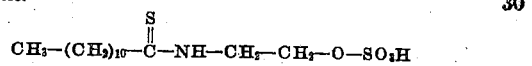

This compound has surface-active properties and is useful as a detergent.

Example V

Sulfonated N-dodecylthiobenzamide—sodium salt

In a reaction vessel equipped with a reflux condenser, a stirrer, and a gas inlet tube are placed 103 parts of benzonitrile, 203–5 parts of n-dodecylamine and 500 parts of ethyl alcohol. The reaction mixture is heated to boiling, and hydrogen sulfide is passed into the solution for 16 hours. The alcohol is then distilled off, leaving a brown oil which boils at about 235° C. at 3 mm. pressure. This oil is dissolved in low boiling gasoline and the solution cooled. Yellow plates of N-dodecylthiobenzamide are obtained, melting point 44–45° C. This compound is sulfonated by dissolving the entire quantity obtained in 2 mols of 100% sulfuric acid at 40–45° C., allowing the mixture to stand for about 6 hours, and then pouring it into ice water. This solution is then neutralized with sodium hydroxide, and extracted with low-boiling gasoline to remove any unsulfonated material. There is thus obtained an aqueous solution of the sodium salt of a ring sulfonated N-dodecylthiobenzamide, of the formula

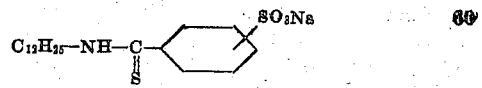

It is soluble in water and has surface-active properties.

Example VI

N-(β-dimethylaminoethyl) thiooleamide

In a pressure vessel are placed 10 parts of N, N-dimethylethylenediamine (β-dimethylaminoethylamine), 26.3 parts of oleonitrile, and 50 parts of ethyl alcohol. This reaction mixture is saturated with hydrogen sulfide, and the vessel sealed and heated for 10 hours at 100° C. It is then opened and the alcohol evaporated off. The resulting product is N-(β-dimethylaminoethyl) thiooleamide of the formula

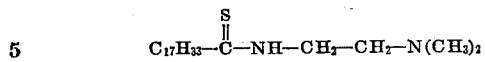

It is soluble in dilute hydrochloric and acetic acids and is surface-active. On treatment with methyl iodide or dimethyl sulfate, the product is converted into surface-active quaternary ammonium salts which are stable to acids and bases.

EXAMPLE VII

N-(ε-carboxyamyl) thiolauramide—Sodium salt

In a pressure vessel are placed 17 parts of sodium ε-aminocaproate, 15 parts of water, 100 parts of ethyl alcohol, and 18 parts of lauronitrile. This reaction mixture is saturated with hydrogen sulfide at 0° C. The vessel is then sealed and heated in a furnace at 100° C. for 8 hours, after which it is cooled and opened, and the contents evaporated to dryness. The resulting solid is the sodium salt of N-(ε-carboxyamyl) thiolauramide, of the formula

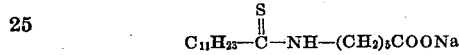

It is soluble in water and shows surface-active properties.

In place of the pure lauronitrile used in Examples I, III, IV, and VII, it is possible to employ the mixture of nitriles obtained from coconut oil acids and ammonia in the presence of a dehydration catalyst, as described in Wortz, Serial No. 173,196, filed November 6, 1937. In such case, mixtures of thioamides will be obtained. The respective N-substituted thioamides will be present in about the following proportions: Thiocaproamides 2%, thiocaprylamides 9%, thiocapramides 10%, thiolauramides 45%, thiomyristamides 20%, thiopalmitamides 5%, thiostearamides 9%, and thiooleamides and thioarachidamides in traces.

As previously indicated, the principal process described herein can be carried out with any nitrile and any amine containing a primary amino group attached to an aliphatic carbon, one of these reactants having a polar group, subject to the considerations that the sum of the primary amine and nitrile groups shall be less than four, and that the amine and nitrile groups of diamines and dinitriles shall be separated by chains of at least two carbons. The polar group should of course be one which does not interfere, at least not to any great extent, with the thioamide-forming reaction, and may be a hydroxyl group, tertiary amine group, acid group, e. g., —SO₂OH, —O—SO₂OH, or —COOH or salt group, e. g., alkali metal or amine sulfonate, sulfate, or carboxylate, or a quaternary ammonium group. Of the acid groups, the sulfur acid groups, e. g., sulfo and sulfato are preferred.

Specific nitriles suitable for use in the process include acetonitrile, isobutyronitrile, caprylonitrile, capronitrile, undecanonitrile lauronitrile, myristonitrile, palmitonitrile, stearonitrile, oleonitrile, benzonitrile, naphthonitrile, sodium β-cyanoethylsulfonate, sodium p-cyanobenzenesulfonate, p-cyanodimethylaniline, N-diethylaminocapronitrile, furonitrile, nicotinonitrile, m-hydroxybenzonitrile, mixed naphthenic acid nitriles, acrylonitrile, methacrylonitrile, allyl cyanide, 12-hydroxystearonitrile, fumaronitrile, N-phenylaminoacetonitrile, N-diethylaminoacetonitrile, phthalonitrile, and 1-cyano-4-pentene.

Specific amines suitable for use in the process include: β-aminoethanol, β-aminoethanesulfonic acid, sodium β-aminoethanesulfonate, N,N-dimethylethylenediamine, N,N - dimethylhexamethylenediamine, glycine, ε-aminocaproic acid, ethylamine, butylamine, ethylenediamine, n-dodecylamine, 9,10-octadecenylamine, hexamethylenediamine, decamethylenediamine, octadecamethylenediamine, 1,4-cyclohexylenediamine, n-octadecylamine, n-heptadecylamine, bis-α,α'-diaminodipropyl ether, benzylamine, 2-ethylhexylamine, 8-aminopentadecane, p-hydroxybenzylamine, m-diethylaminobenzylamine, allylamine, methallylamine, and 1-amino-5-hexene.

As also previously indicated, the present invention is general to surface-active, i. e., polar-substituted, monomeric amides of carbothionic acids in which the thiocarbonyl structure is attached to carbon as well as to amido nitrogen, and in which the amide groups are preferably all secondary, by which is meant containing the

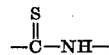

structure. All the products of the examples, all of those in the table, and those obtained from appropriately selected pairs of amines and nitriles in the above lists are of this type. The most useful types are those having an open hydrocarbon chain of at least eight carbon atoms in some portion of the molecule, and these therefore form a preferred class.

In carrying out the present process, temperatures of from about 50° C. to about 200° C., and in some cases higher, may be used. The temperature should be below that at which destructive carbonization takes place. The pressure may be atmospheric or above, depending on the particular method of reaction chosen. The diluent may be any organic liquid which is inert to reactants and product, a solvent for the reactants, and a solvent or non-solvent for the product. Suitable specific diluents include ethanol, butanol, pentanol, dioxan, acetone, β-methoxyethanol, toluene, xylene, benzene, and the like. The ratios of reactants given in the examples are not limiting. A slight excess of amine over that required to react with the nitrile is preferable, but the process can also be operated with excess nitrile. A slight excess of hydrogen sulfide is preferably, though not necessarily, used in all cases.

The new compositions covered in this case belong to the class of surface-active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form, and, if desired, in conjunction with known processing or treating agents. They may be used by themselves or in combination with other surface-active agents in any reaction in which surface-active agents having colloidal properties have heretofore been used. In general, they may be employed for any of the purposes given in Downing and Johnson application Serial Number 200,530, filed April 6, 1938.

The above description and examples are intended to be illustrative only. Any modification of or variation therefrom which conforms to the spirit of the invention is intended to be included within the scope of the claims.

I claim:

1. A monomeric, surface-active, amide of a carbothionic acid in which all thiocarbonyl groups are attached to carbon, said amide containing a water solubilizing polar substituent.

2. A surface-active amide of a monobasic carbothionic acid in which the thiocarbonyl group is attached to carbon and all the amide groups are secondary, said amide containing a water solubilizing polar substituent.

3. A monomeric, polar-substituted, surface-active, amide of a carbothionic acid in which all thiocarbonyl groups are attached to carbon and all the amide groups are secondary, said amide containing an open hydrocarbon chain of at least eight carbon atoms.

4. A monomeric, polar-substituted, surface-active, amide of a monobasic carbothionic acid in which the thiocarbonyl group is attached to carbon and all the amide groups are secondary, said amide containing an open hydrocarbon chain of at least eight carbon atoms.

5. A monomeric amide of a carbothionic acid in which all thiocarbonyl groups are attached to carbon and all the amide groups are secondary, said amide also containing a polar group selected from the class consisting of hydroxyl, tertiary amino, acid and salt groups.

6. A monomeric amide of a carbothionic acid in which all thiocarbonyl groups are attached to carbon and all the amide groups are secondary, said amide also containing an open hydrocarbon chain of at least eight carbon atoms and a polar group selected from the class consisting of hydroxyl, tertiary amino, acid, and salt groups.

7. An amide of the formula $R^1(CS-NH-R^2-Z)v$ in which $R^1$ and $R^2$ are hydrocarbon radicals, $R^2$ being aliphatic, $v$ is the valence of $R^1$, and $Z$ is a polar group selected from the class consisting of hydroxyl, tertiary amino, acid, and salt groups.

8. An amide of the formula set forth in claim 7, in which one of the R's has an open hydrocarbon chain of at least eight carbon atoms.

9. An amide of the formula set forth in claim 7, in which $R^1$ has an open hydrocarbon chain of at least eight carbon atoms.

10. A monomeric amide of a carbothionic acid in which all thiocarbonyl groups are attached to carbon, all the amido groups are secondary and there is present an acid group.

11. A monomeric amide of a carbothionic acid in which all thiocarbonyl groups are attached to carbon, all the amido groups are secondary and there is present an acid group and a hydrocarbon chain of at least eight carbon atoms.

12. A monomeric amide of a carbothionic acid in which all thiocarbonyl groups are attached to carbon, all the amido groups are secondary and there is present a sulfur acid group.

13. A monomeric amide of a carbothionic acid in which all thiocarbonyl groups are attached to carbon, all the amido groups are secondary and there is present a sulfur acid group and a hydrocarbon chain of at least eight carbon atoms.

14. Process for preparing surface-active thioamides which comprises reacting hydrogen sulfide with a nitrile and with an amine having at least one primary amino group which is attached to an aliphatic carbon atom, the amine and nitrile being so selected that one of them contains a polar group different from the reacting groups, the sum of the nitrile and primary amino groups is less than four, and, when either has a plurality of reacting groups, said groups are separated by a chain of at least two carbon atoms contiguous therewith.

15. A monomeric, surface-active amide of a carbothionic acid in which all thiocarbonyl groups are attached to carbon and all the amide groups are secondary, said amide containing a water solubilizing polar substituent.

16. Sodium N-(beta-sulfoethyl) thiooleamide.

17. Sodium N-(beta-sulfatoethyl) thiolauramide.

18. N-(beta-dimethylaminoethyl) thiooleamide.

WILLIAM EDWARD HANFORD.

Certificate of Correction

Patent No. 2,201,171. May 21, 1940.

WILLIAM EDWARD HANFORD

It is hereby certified that errors appear in the printed specification of the above numbered patent requiring correction as follows: Page 1, second column, line 15, for "dintrile" read *dinitrile*; page 3, first column, line 10, after the word "boils" insert *at*; line 45, for "-4, 5-" read *-4,5-*; and second column, line 48, for "Yellw" read *Yellow*; page 5, first column, line 34, claim 7, in the formula, for "v" read *v*; and that the said Letters Patent should be read with these corrections therein that the same may conform to the record of the case in the Patent Office.

Signed and sealed this 17th day of September, A. D. 1940.

[SEAL]

HENRY VAN ARSDALE,
*Acting Commissioner of Patents.*